(No Model.)
A. GRAF.
PACKING FOR SAFES, &c.
No. 398,607. Patented Feb. 26, 1889.
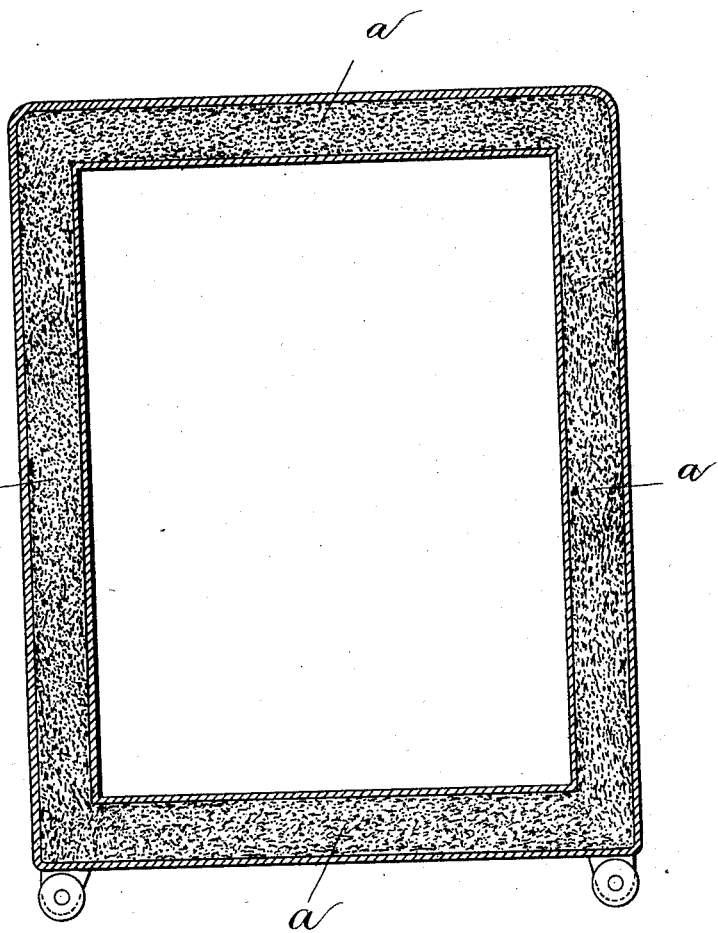
WITNESSES.
H. Brown.
W. C. Ramsay.
INVENTOR.
Anton Graf
By Wright Brown Kinsley
Attys.

UNITED STATES PATENT OFFICE.

ANTON GRAF, OF GEORGETOWN, ASSIGNOR OF TWO-THIRDS TO GEORGE H. MEADER, OF BOSTON, MASSACHUSETTS.

PACKING FOR SAFES, &c.

SPECIFICATION forming part of Letters Patent No. 398,607, dated February 26, 1889.

Application filed April 26, 1888. Serial No. 271,943. (No model.)

*To all whom it may concern:*

Be it known that I, ANTON GRAF, of Georgetown, in the county of Essex and State of Massachusetts, have invented certain new and useful Improvements in Packing for Safes, &c., of which the following is a specification.

This invention has for its object to provide a fire-proof packing for safes, &c., which shall be a more perfect non-conductor of heat than any material heretofore employed.

The invention consists in a packing composed of purified fossil meal, or fossil meal which has been treated to remove from it all combustible and heat-conducting matters that may be present in the crude material.

In carrying out my invention I take crude fossil meal, which, as is well known, is mainly petrified peat, and subject it to the action of a sufficient degree of heat to remove from it all vegetable or other matter which is combustible and to convert any infusoria which may be in the fossil meal into lime. This may be accomplished by saturating the fossil meal or portions of a pile thereof with kerosene-oil and then burning the oil, or by placing the fossil meal in a furnace, or in any other suitable way. I prefer to expose the crude fossil meal to the air for several hours prior to the burning operation for the purpose of bleaching it. After the removal of the combustible matter there are usually small quantities of non-combustible foreign matter—such as sand, lime resulting from the action of heat on infusoria, and sometimes other matters remaining in the petrified matter, and as these foreign matters are conductors of heat I treat the mass to remove such foreign matters from the fossil meal. To this end I immerse the entire mass in a tank of water and agitate it. The pure petrified matter, which is very light, is caused by the agitation to rise and float on the water, while the sand and the more impure petrified matter sink to the bottom of the tank. The floating petrified matter is caused to flow into a second tank and remain there until it settles and forms a reasonably pure pulp of a uniform specific gravity and having no foreign heat-conducting matter, excepting a small proportion of lime or chalk. I then add sulphuric acid thereto in the proportion of about two pounds of acid to one ton of pulp for the purpose of removing all traces of lime or chalk. The material is now purified and reduced to pure petrified matter, free from all foreign heat-conducting matter. The purified fossil meal may be pressed into blocks or dried and pulverized. This material is found to possess so little heat conductivity that a wall filled with and subjected to intense heat at one side will not be uncomfortably warm to the touch at the other side.

The accompanying drawing, forming a part of this specification, represents a sectional view of a safe the walls of which contain fillings *a a a a* of purified fossil meal.

I claim—

1. A fire-proof packing composed of purified fossil meal, as set forth.

2. A safe or receptacle having its walls packed with purified fossil meal, as set forth.

In testimony whereof I have signed my name to this specification, in the presence of two subscribing witnesses, this 23d day of April, A. D. 1888.

ANTON GRAF.

Witnesses:
GEO. H. MEADER,
C. F. BROWN.